United States Patent
Porte et al.

(10) Patent No.: US 6,592,078 B2
(45) Date of Patent: Jul. 15, 2003

(54) PROCESS FOR DE-ICING AN AIR INTAKE COWLING OF A REACTION MOTOR AND DEVICE FOR PRACTICING THE SAME

(75) Inventors: Alain Porte, Colomiers (FR); Nathalie Pascal, Colomiers (FR); Gilles Chene, Toulouse (FR); Fabienne Montetagaud, Blagnac (FR)

(73) Assignee: Airbus France, Toulouse Cedex (FR)

( * ) Notice: Subject to any disclaimer, the term of this patent is extended or adjusted under 35 U.S.C. 154(b) by 0 days.

(21) Appl. No.: 10/074,034

(22) Filed: Feb. 14, 2002

(65) Prior Publication Data

US 2002/0139900 A1 Oct. 3, 2002

(30) Foreign Application Priority Data

Feb. 15, 2001 (FR) .............................................. 01 02088

(51) Int. Cl.$^7$ ............................................... B64D 15/04
(52) U.S. Cl. ................................................. 244/134 B
(58) Field of Search ........................ 244/134 R, 134 B, 244/134 C

(56) References Cited

U.S. PATENT DOCUMENTS 3,933,327 A  *  1/1976  Cook et al. ............. 244/134 B
5,841,079 A     11/1998  Parente ..................... 181/214
5,944,287 A  *  8/1999  Rodgers ................. 244/134 R

FOREIGN PATENT DOCUMENTS

| EP | 0 823 547 | 2/1998 |
| EP | 1 103 462 | 5/2001 |

* cited by examiner

Primary Examiner—Robert P. Swiatek
(74) Attorney, Agent, or Firm—Young & Thompson

(57) ABSTRACT

A process for de-icing an air intake cowling (5) of a reaction motor, having an air intake lip (6a), a de-icing system (10) and acoustic attenuation part (11), where the acoustic attenuation part includes separate islands (11a) formed by a sandwich of an acoustically resistive porous layer forming a portion of the external envelope (6i) of the fan channel delimited by the air intake lip, a cellular core, and a reflector (13), has the steps of sending into the lip, preferably in the direction of the acoustic attenuation islands, the warm fluid under pressure of the de-icing system, and causing the fluid to escape outside the cowling, through one or several openings (20) of suitable shape and size, provided in the cowling.

16 Claims, 7 Drawing Sheets

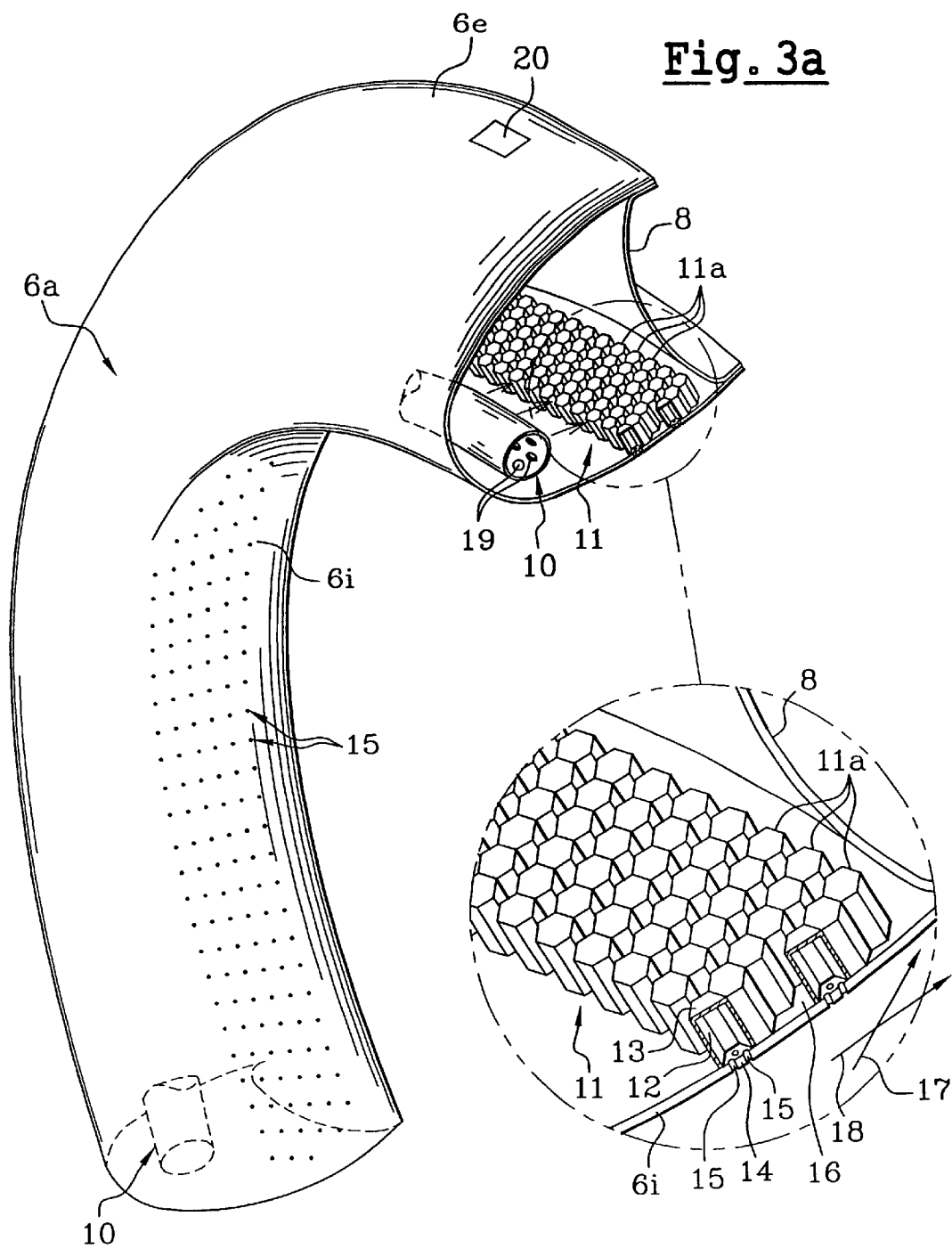

PROCESS FOR DE-ICING AN AIR INTAKE COWLING OF A REACTION MOTOR AND DEVICE FOR PRACTICING THE SAME

The present invention relates to de-icing air intake cowlings of reaction motors, particularly aircraft.

The requirements of the authorities for certification and the rules concerning noise imposed by airports limit the level of noise needed during takeoff and landing. The noise generated by a transport airplane arises both from the airframe and from the motor. The noise of the motor originates in different sources, such as for example the noise generated by the turbine or by the compressor or the noise generated by the fan.

The noise produced by the motor is preponderant over the noise generated by the airframe in the takeoff phase because the motor operates in full throttle.

This source of noise is detrimental. For example, above a certain value, the aircraft will not be permitted to take off or to land other than at certain specified times that are not troublesome for the local communities.

This is the reason why certain precautions are nowadays taken by aircraft builders and engine makers to decrease the sonic emissions of the motors installed in aircraft.

Thus, panels for the attenuation of noise engendered by aircraft motors are installed in certain places in the nacelle, for example at the intake and outlet of the fan channel, or else on the doors of the pressure reversers.

From FR 2 261 583, there is known an acoustical treatment for an air intake of an aircraft motor in which the acoustic panel is applied symmetrically to the fan channel for optimum suppression of noise.

In EP 0 823 547, so as to improve further the acoustic attenuation, there are added acoustic attenuation panels to the attack edges of the air intake lip of the cowling.

Nevertheless, these attack edges are subjected to temperature and moisture conditions such that at present ice forms on them. The formation and accumulation of ice on the attack edge of the air intake lip poses several problems. If large pieces of ice break off, they thus penetrate the air intake and are ingested by the motor, thereby risking damaging the elements of said motor and decreasing performance. Moreover, the accumulation of ice modifies the contours of the attack edge of the air intake lip and generates undesirable aerodynamic effects.

To solve these problems, de-icing systems for the air intake edge have been installed. They inject warm air under pressure, taken from the motor, directly onto the skin of the internal surface of the air intake lip to prevent in the most effective manner possible the formation and accumulation of ice under conditions of normal use of the motor.

However, in EP 0 823 547, panels constituted of a sandwich comprising a honeycomb structure bounded, on the air flow side, by an acoustically resistive layer and, on the opposite side, a rear reflector, are added to the interior of the attack edges of the air inlet lip.

These acoustic attenuation panels added to the attack edge of the lip form a screen, preventing warm air under pressure to reheat the attack edge of said lip and to melt the ice which is accumulated thereon. Carrying out commercial flights can, under certain climatic conditions, be dangerous.

Thus, the conventional de-icing system with the injection of warm air under pressure cannot be used in the context of acoustic treatment such as described in EP 0 823 547.

Moreover, U.S. Pat. No. 5,841,079 discloses an acoustic attenuation panel located in the air inlet lip and permitting de-icing said lip. The air inlet comprises a lip comprising an acoustic panel and a device for the injection of fluid under pressure, said fluid having a temperature sufficient to avoid the formation of ice on the air inlet lip. The acoustic panel is conventionally: a honeycomb core sandwiched between a porous layer and an acoustical reflecting layer. The porous layer and the acoustically reflecting layer are both pierced with holes so as to permit the fluid under pressure to pass through the acoustic panel and de-ice the lip.

However, the geometry and dimensions of the air inlet are adapted to the performance of the motor. The latter thus "seize" an airflow rate corresponding to the inlet air.

Nevertheless, the device described in U.S. Pat. No. 5,841,079 increases, because of said holes, the air flow ingested by the motor. The motor can thus be facing different airflow rates accordingly as the de-icing system is activated or not. This has a certain effect on its performance, runs counter to the wishes of engine builders who define the performance of their engines relative to a fixed air intake geometry.

Moreover, the confrontation in the cells of the honeycomb, of the sonic waves with the fluid under pressure, disturbs the operation of the acoustic panel, which decreases the acoustic efficiency of said panel.

The invention seeks to overcome the drawbacks and limitations of the existing systems set forth above, by providing a solution permitting associating the conventional de-icing system with the injection of warm air under pressure, and the addition in the attack edge of the air inlet lip of an acoustic attenuation panel.

To this end, the invention has for its object a process for de-icing an air intake cowling of a reaction motor, comprising an air inlet lip, a system for de-icing the lip supplied with warm fluid under pressure, and means for acoustic attenuation forming an integral portion of a predetermined region of said lip, characterized in that it consists in constituting said acoustic attenuation means by separate islands each formed by a sandwich comprising an acoustically resistive porous layer forming a portion of the external envelope of the fan channel delimited by said air intake lip, a single or multi-layer porous cellular core, and a reflector, sending into the lip, preferably in the direction of said acoustical attenuation islands, the warm fluid under pressure of said de-icing system, and causing said fluid to escape outside said cowling, through one or several openings of suitable shape and size, provided in said cowling.

The acoustic function is carried out by the islands whose porous surface is exposed to the aerodynamic flow and permits attenuating the noise generated by the motor.

The de-icing function of the air intake lip, particularly in line with the blower channel, where the acoustic attenuation structure is located, is efficaciously produced by the flow of warm fluid which enters into the spaces between the islands, preferably arranged to define between them corridors or throats more or less straight or sinuous and suitably oriented, so as to bathe directly the internal surface, not covered by the islands, of the wall of the lip.

Effective de-icing is thus ensured at the height of the internal wall of the lip and without the rejection of de-icing fluid into the fan channel because where the fluid bathes said wall, there is no communication with the outside of the lip, the wall of this latter at this place not being porous.

Increased de-icing is moreover performed by said porous surfaces of the islands, which bathe in the warm fluid, by conduction or through the cellular structure.

The islands can have different structures and be constituted by juxtaposed strips of a honeycomb material or of juxtaposed tubular lugs perpendicular to the wall of the air intake lip.

As a modification, the islands can have a common reflector covering all of them and provided with scoops channeling the de-icing air toward the inter-island spaces.

The invention also has for its object the air intake cowlings obtained by the practice of the process described above, particularly those which will be described hereafter by way of example for illustration of the process, and with respect to the accompanying drawings, in which:

FIG. 3a is a perspective view of a section of the air intake lip of FIG. 1 provided with an acoustical attenuation structure with de-icing function, according to the invention;

FIG. 3b is a fragmentary cross-sectional view of an air intake lip of the type of FIG. 3a;

Figure 1:
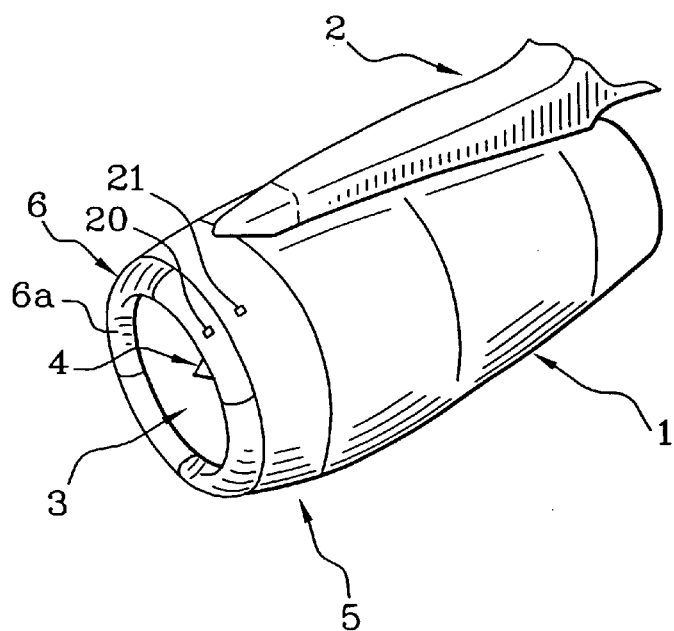
FIG. 1 is a schematic perspective view of an aircraft reaction motor.

There is shown in FIG. 1 an aircraft turbo reactor comprising a nacelle 1 coaxially surrounding the motor itself and fixed for example to a wing (not shown) of the aircraft by means of a mast generally designated by reference numeral 2.

The nacelle 1 has an annular cross-section and defines between itself and the central portion of the motor, an annular channel 3 called a fan channel. There is shown at 4 in the drawing, the nose of ogive shape of the fan driven by the motor and which is disposed at the inlet of the channel.

The front portion of the nacelle defines an air intake cowling 5 which has for its function to ensure the aerodynamic flow of the air, on the one hand, toward the fan channel 3 and, on the other hand, toward the exterior of the nacelle 1.

Figure 2:
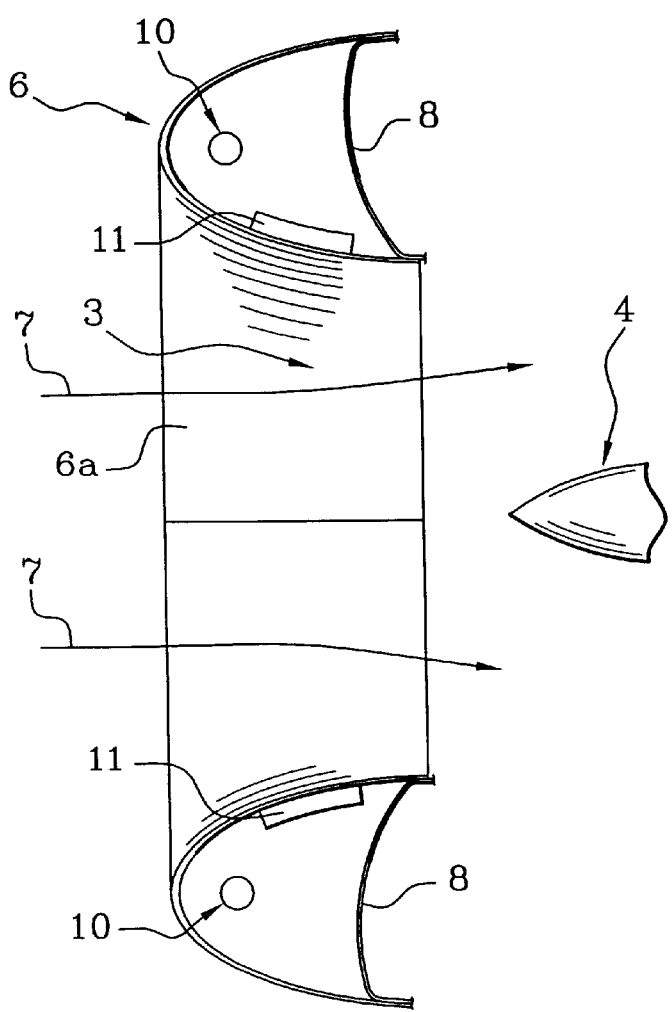
FIG. 2 is an axial cross-sectional view of the air intake structure of the motor of FIG. 1.

As can be seen in FIG. 2, which is in fragmentary axial cross-section of the cowling 5, the latter is prolonged forwardly by an air intake lip 6 having a U-shaped cross-section opening rearwardly. This lip ensures the division of the air between the portion 7 which enters the fan channel and the portion which flows about the nacelle.

The rear of the lip 6 is formed by an internal partition 8.

As shown schematically in FIG. 2, the invention seeks to combine de-icing of the lip 6, in particular its wall delimiting the inlet of the fan channel 3, with the help of a conventional system using warm air under pressure delivered into the annular space delimited by the lip, and an acoustical attenuation about the internal periphery of the lip. The de-icing system is for example constituted by an annular tubing indicated at 10, provided with a plurality of ejection orifices or equivalent system, also known and formed by injectors with one or several injection nozzles.

According to the invention, particularly the wall of the lip 6 turned toward the fan channel 3, is provided with an acoustical attenuation structure of the sandwich type constituted by a cellular core or the like, covered, on the one side, with an acoustically resistive porous layer and, on the other side, with a total reflector, said structure being symbolized at 11 in FIG. 2 and extending preferably circularly over all the internal periphery of the lip.

The lip 6 is generally constituted by four sections or sectors of 90°, as shown in FIG. 1, abuttingly joined with fasteners.

FIG. 3a shows a perspective of one of these sectors, 6a, provided with an acoustic attenuation structure 11 according to a first embodiment.

The acoustic attenuation structure 11 is constituted by islands in the form of strips 11a disposed in parallel, with a predetermined spacing between them, in an annular region of the lip (6a) coaxial with the fan channel 3, and extending from one end to the other of the sector 6a.

In the embodiment shown in FIG. 3a, each island strip 11a for acoustical attenuation is connected and fixed, with the help of suitable means of which examples will be given later, onto the internal surface of the internal wall 6i of the lip, in a region in the form of a strip of a predetermined width.

Each island strip 11a comprises a central cellular core 12 of the honeycomb type, the axes of the cells being perpendicular to the wall 6i of the lip.

The recesses 12 are closed, on the internal side of the lip, by a layer or skin 13 forming a total reflector and, on the other side, by a portion 14 of the wall 6i which is rendered porous for example by piercing holes represented by 15 on the enlarged portion of FIG. 3a, the reference 15 indicating on the other portion of the figure simply the emplacement of each group of holes of each cell 12.

Between the portions 14 of the wall 6i of the lip, extend portions 16 corresponding to the intervals between strips 11a and which are not pierced.

The region of the wall 6i of the lip facing the acoustic attenuation structure 11 extends for example between the tubing 10 for the supply of warm air under pressure for de-icing, and the internal partition 8.

The strips 11a are preferably disposed obliquely such that the spaces between strips form corridors or throats whose direction (arrow 17) is not perpendicular to the partition 8.

In other words, the axis 17 of the strips 11a forms an angle relative to the axis of the fan channel 3, symbolized by the arrow 18 in FIG. 3a. Such an orientation of the strips gives better mixing of the flow circulating within the lip and a better quality of heat exchange.

The tubing 10 is pierced in known manner with openings 19, if desired provided with injection nozzles, distributed along the tubing and oriented toward the regions to be de-iced.

These openings 19 direct de-icing air particularly toward the corridors between the strips 11a which channel it by forcing it to bathe the internal surface of the portions 16 of the wall 6i of the lip.

The air then escapes to the external atmosphere in the conventional way, which is to say by means of one or several openings, for example in the form of slots whose number and size as well as their distribution over the external periphery of the cowling 5 can vary.

There is shown in FIG. 3a, at 20, such an opening for a rejection to the exterior of the lip.

Figure 3B:
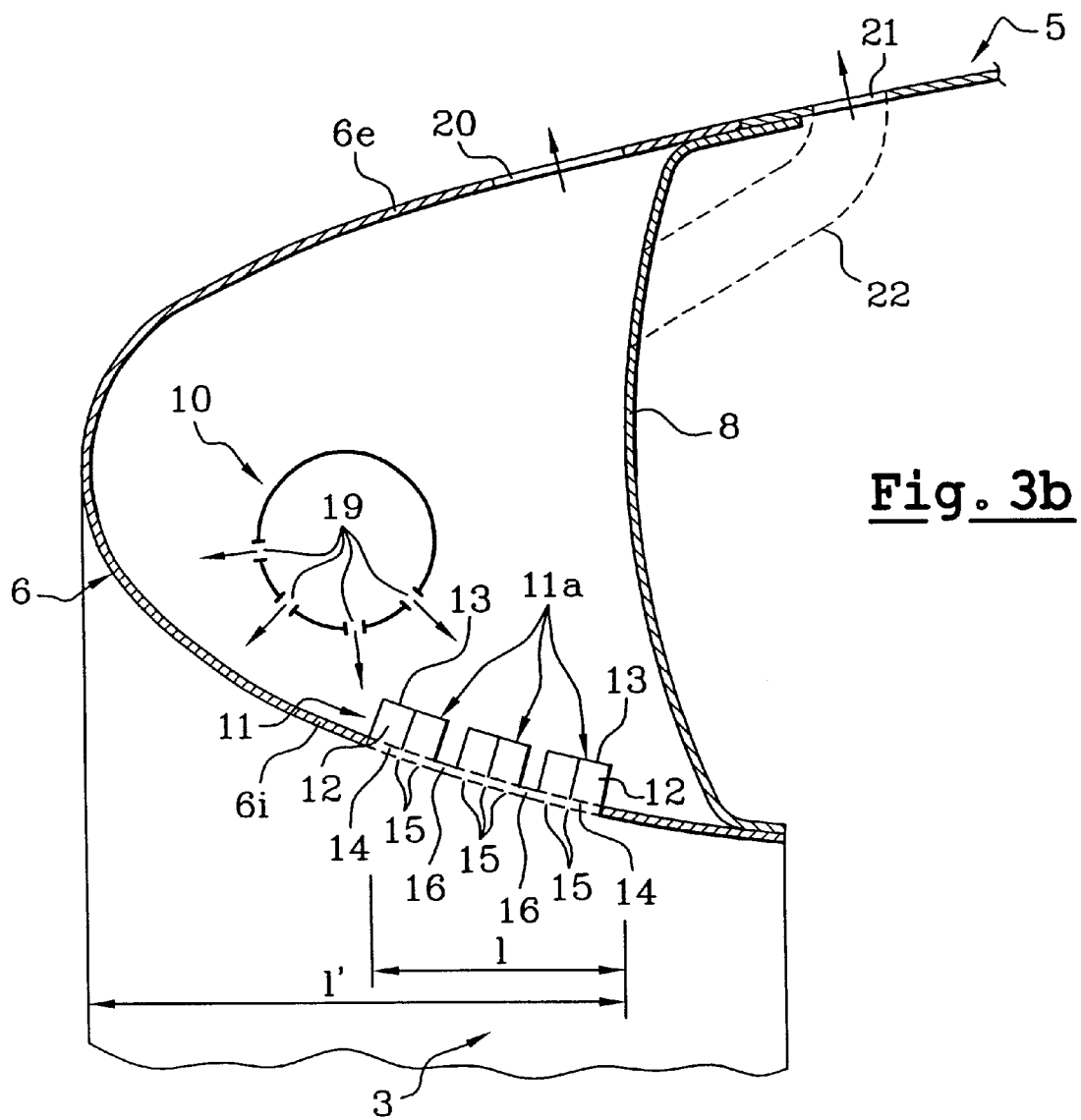

In FIG. 3b, which is a schematic transverse cross-section of an air intake lip 6 of the type of FIG. 3a, there is shown in cross-section three strips 11a disposed obliquely and covering a region of width 1 of the wall 6i between the tubing 10 and the partition 8.

This region can be enlarged up to the extreme front end of the lip 6 to achieve a width 1' so as to improve acoustic attenuation without thereby degrading de-icing.

There is shown schematically at 20 in FIG. 3b, an opening provided in the external wall 6e of the lip to reject to the exterior of this latter, opposite the fan channel 3, the de-icing air.

At 21 is schematically shown a modification of an opening provided more downstream in the cowling 5 to reject de-icing air coming from the interior of the lip 6 via a conduit 22 passing through the partition 8.

In the devices shown in FIGS. 3a and 3b, not only is an acoustic attenuation function performed by the attenuation strips 11a, but suitable de-icing of the internal wall 6i of the lip is also ensured, both directly in the portions 16, and indirectly in the portions 14, by conduction through the cellular structure 12.

This de-icing is ensured without rejecting air into the fan channel 3, because the air does not reach the portions 14 and is rejected externally of the cowling 5.

The dimensions of the cells of the structures 12, particularly the height, may of course vary.

The structures 12 are single layer or multi-layer, which is to say with superposed resonators, separated or not by septa.

As a function of the conductibility of the materials used, the intervals between the strips 11a are suitable to the quality of desired de-icing.

Figure 4A:
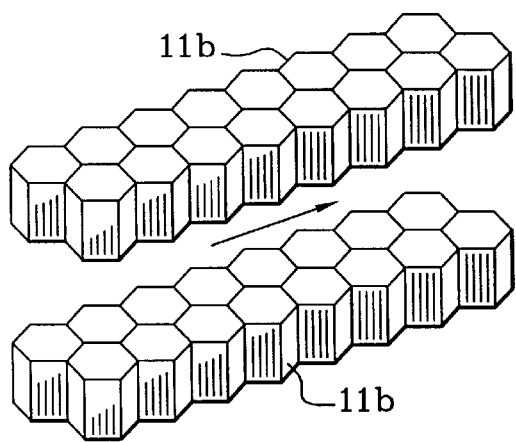
FIGS. 4a and 4b show two modified embodiments of an acoustical attenuation structure according to the invention using a honeycomb material.
Figure 4B:
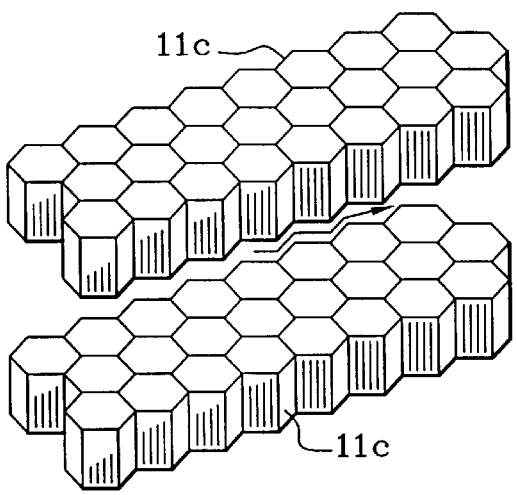

FIGS. 4a and 4b show modified embodiments in which the strips of islands have a different width, two rows of cells in the strips 11b of FIG. 4a, three rows in the strips 11c of FIG. 4b.

The interval between strips is relatively great in FIG. 4a or relatively small in FIG. 4b in which the path of the de-icing air in the throats zigzags as indicated by the arrow.

Instead of annular tubing 10 extending through all the lip 6, the de-icing system can be constituted, also in known manner, by one or several injectors, emptying into the lip 6 at one or several places and each comprising one or several injection nozzles directing warm air in a circular path within the lip, the air escaping outwardly as in the case of tubing 10. Such a system is shown schematically in FIGS. 7 and 8, which will be described later.

In this case, the orientation of the strips 11a is such as to take account of the direction of circulation of the de-icing air within the lip 6.

Figure 5A:
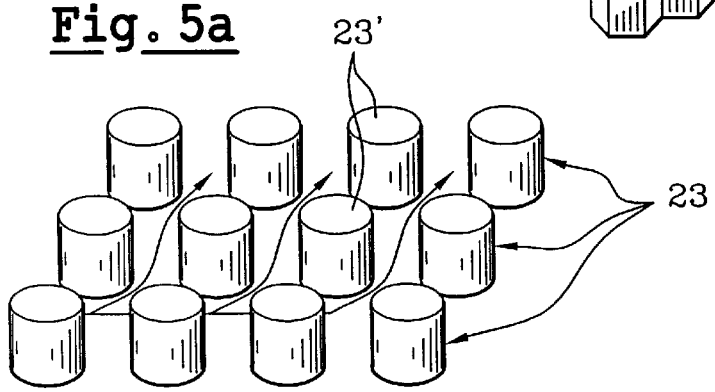
FIGS. 5a and 5b show two embodiments of an acoustical attenuation structure according to the invention using tubular lugs.
Figure 5B:
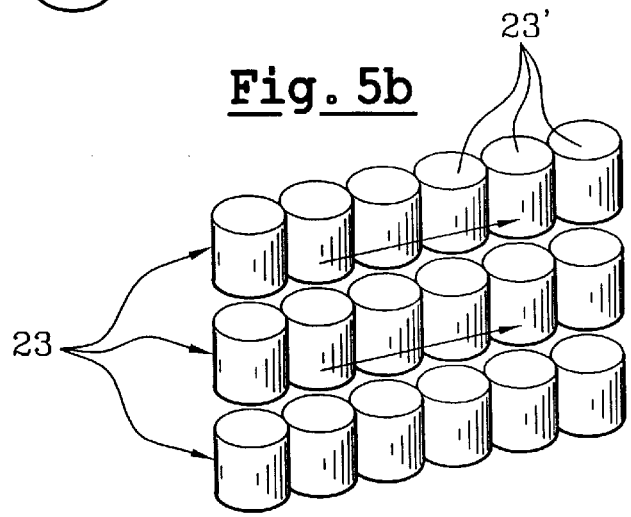

FIGS. 5a and 5b show two embodiments of the acoustic attenuation structure 11 in the form of islands 23 constituted by tubular lugs separated from each other or together, according to all possible combinations.

The island lugs 23 are for example simple cylindrical tubes of compatible material as to welding or braising to the lip 6. The tubes are closed at one end by a layer or skin 23' forming a reflector analogous to the reflector 13 of the island strips 11a. They are connected and fixed to the internal surface of the wall 6i of the lip at the desired positions, then the portion of the wall 6i facing the tubes is pierced like the portions 14a of FIG. 3a.

These island lugs 23, which contain for example simply air, thereby ensure the acoustic attenuation function. The lugs 23 can of course, like the strips 11a, constitute superposed resonators separated by septa.

In a manner analogous to that described with respect to the island lugs 11a, the de-icing air will flow between the lugs 23, as shown by the arrows in the figures between the individual lugs (FIG. 5a) or between the rows of lugs (FIG. 5b) which are for example oriented like the strips 11a of FIG. 3a.

Acoustic attenuation is ensured in line with the lugs 23 and the de-icing in line with the intervals between the lugs, as well as in a supplemental way by conduction in line with the lugs.

Figure 6A:
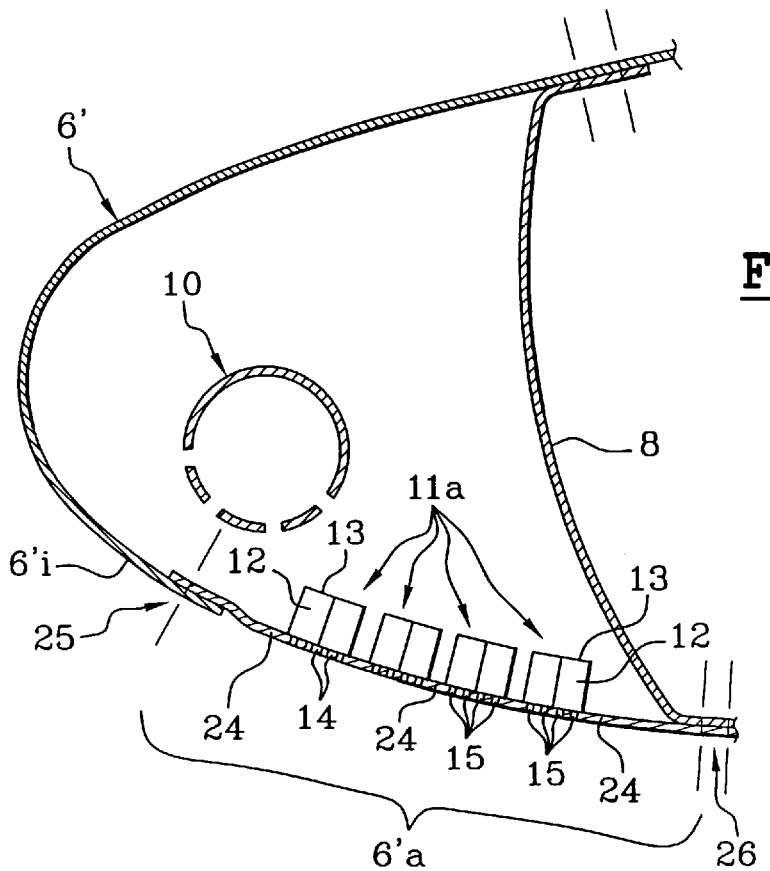
FIGS. 6a and 6b show two modified embodiments of an air intake lip according to FIG. 3b.
Figure 6B:
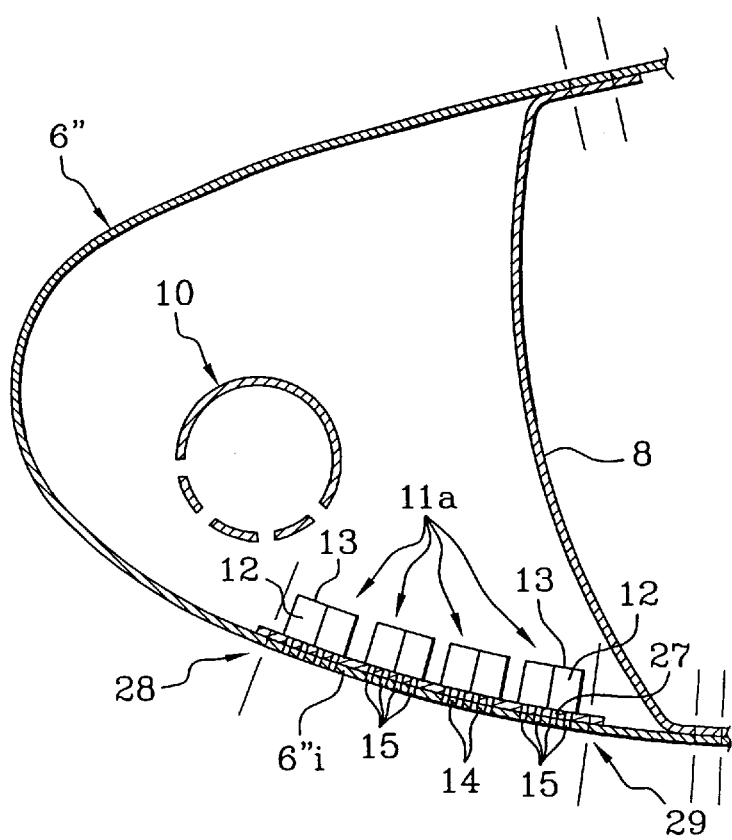

FIGS. 6a, 6b show two other modes of construction of the portion of the wall 6i of the lip where the two functions of de-icing and acoustical attenuation take place.

Although in the case of FIG. 3b, the lip 6 is made first in its totality and then pierced at the desired positions, in the embodiment of FIG. 6a, the lip 6' is made partially, which is to say without the portion (6'a) of the internal wall 6i integrating the acoustic attenuation structure.

This portion 6'a is produced separately and can be constituted of the same elements as those of FIG. 3b except that the wall 24 to which is secured the elements 12 and 13 analogous to those of FIG. 3b, have an annular shape and are secured and fixed, on the one hand, to its upstream edge, on the wall 6i at 25 and, on the other hand, to the downstream wall, on the partition 8 at 26.

The holes 15 in the wall 24, facing the acoustic attenuation island strips 11a, are pierced before emplacement on the portion 6'a.

In FIG. 6b, the lip 6" is identical to that of FIG. 3b and the acoustic attenuation structure is formed by a complete panel, which is to say the island strips 11a each comprising a cellular central core 12, a reflector 13 on the internal side of the lip 6 and a layer 27 for example of a sheet of aluminum on the side of internal wall 6"i of the lip.

The assembly is connected and fixed by welding or cementing at 28 and 29 against said wall 6"i which is then, as well as the sheet 27, pierced with holes 15 facing said strips 11a.

In the various embodiments described above, the extent of the region to be perforated of the internal wall (6i, 6'i, 6"i) of the lip, as well as the size and distribution of the holes 15 in the lip, are determined by a computer, in a known manner, as a function of the different parameters connected to the frequencies characteristic of the noise to be attenuated, to the type of motor, to the nacelle, to the materials used, as well as to the conditions of operation and use of the motor and of the aircraft. The object that is sought is to obtain the best ratio between acoustic gain and loss of de-iced surface.

The cellular structure 12 with its reflective layer 13, which is to say the strips 11a, are secured on the internal surface of the lip, directly or indirectly by means of a metallic sheet 27, by braising, welding or cementing with the help of an adhesive according to the nature of said strips 11a and the wall of the lip. The cellular structure is preferably metallic, for example of stainless steel or of aluminum.

Figure 7:
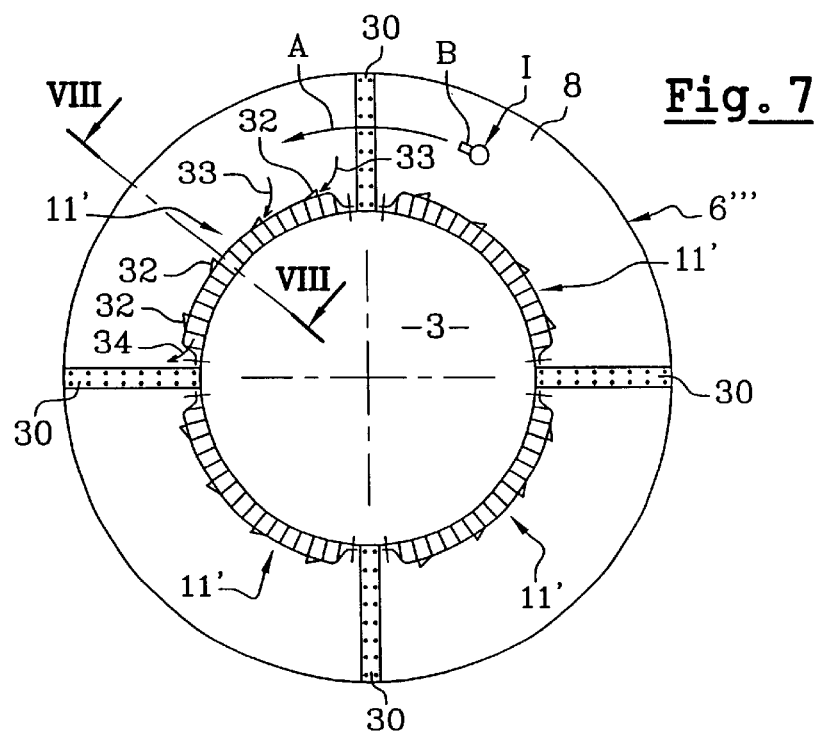
FIG. 7 is a front cross-sectional view of a lip, perpendicular to the axis of the fan channel, showing a modified embodiment of a structure combining de-icing and acoustical attenuation, according to the invention.

FIG. 7 is a front view in cross-section of a lip 6''' constituted of four sectors of 90° held together in abutment by fastenings schematically shown at 30.

Figure 8:
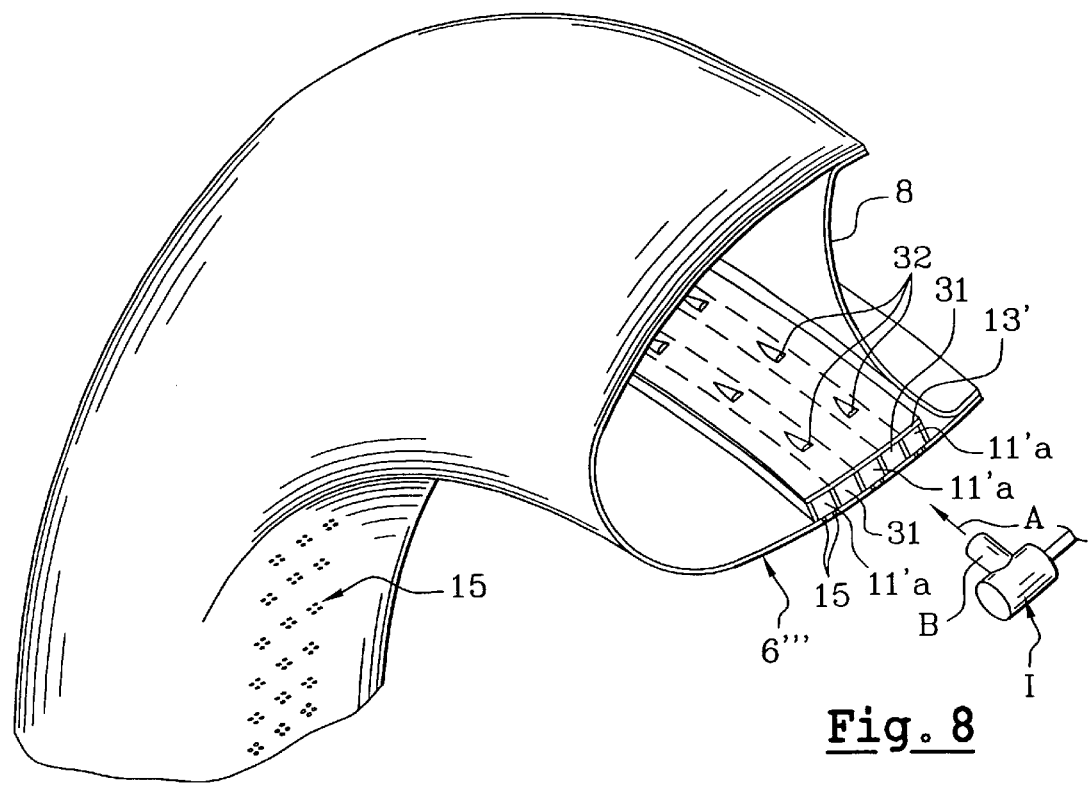
FIG. 8 is a perspective and cross-sectional view on the line VIII—VIII of the structure of FIG. 7.

The acoustic attenuation structure 11' is, according to a modification shown in perspective and in fragmentary view in FIG. 8, constituted of parallel strips 11'a separated by two corridors 31 and each comprising a central cellular core, a reflector 13', and a porous wall delimited by a portion of the internal wall of the lip 6''', pierced with holes 15.

The strips 11'a are, in this modification, orthogonal to the axis of the fan channel 3, which is to say parallel to the partition 8.

Moreover, the reflector 13' is common to the trips 11'a and also covers the corridors 31 separating the strips 11'a, although said reflector 13' is provided in line with each corridor 31 and along this latter, with scoops 32 aligned and oriented in the direction of circulation of the de-icing air. This air is, in the present case, introduced into the lip 6''' with the help of one or several injection systems such as that symbolized at 1 in FIGS. 7 and 8, whose nozzle or nozzles B is or are directed tangentially to the lip so as to give to the air a circular trajectory (arrow A). The air introduced into the corridors 31 by means of the scoops 32, as shown by the arrows 33 in FIG. 7, leaves at the end of the section of the structure 11', as shown by the arrow 34, adjacent one of the fastenings 30.

The de-icing air is rejected outside the air intake cowling as in the case of FIG. 3b, directly from the lip 6''', by one or several openings or slots such as 20, or indirectly through one or several openings or slots such as 21.

The acoustic attenuation structures 11'a can of course be constituted by tubular lugs, such as the lugs 23 of FIGS. 5a, 5b covered with a common skin, forming a reflector and provided with scoops facing the spaces between the lugs.

The dimensions of the portions forming resonators, their mutual arrangement and the degree of porosity of the porous portions integrated into the internal wall of the lip 6''', can also vary over broad ranges, as in the various preceding embodiments.

Figure 9:
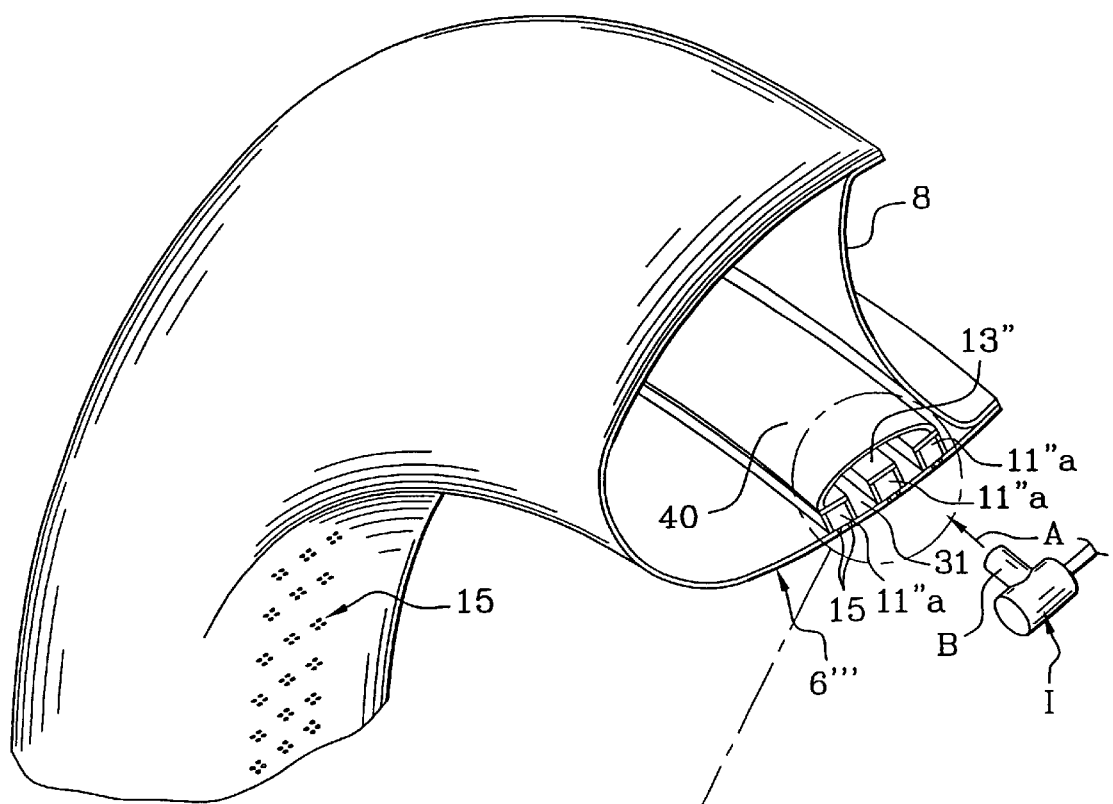
FIG. 9 shows a modification of the device of FIG. 8.
Figure 9:
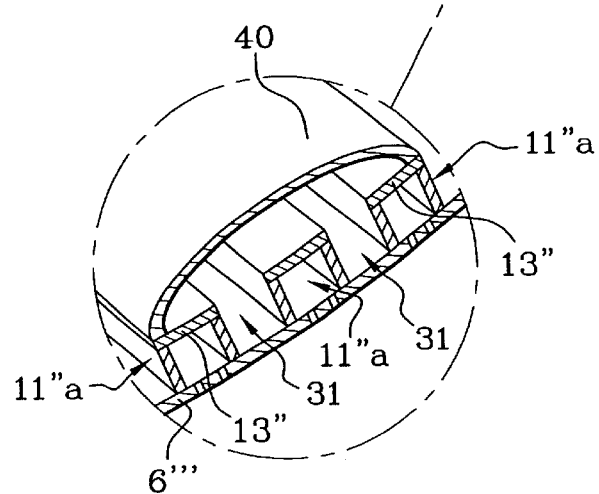

FIG. 9 shows a modified embodiment of FIG. 8 according to which the strips 11"a are individual, which is to say each provided with a reflector 13", the corridors 31 between the strips not being covered as was the case in FIG. 8.

On the contrary, the ensemble of said strips 11"a is covered with a slightly bowed piece 40 fixed on the lateral edges of the set of strips, from one end to the other.

Moreover, one or several openings are provided in the piece 40 to permit air (A) introduced into the lip by the nozzle or nozzles B, to penetrate below the piece 40 which channels the air toward the corridors 31, the air leaving at the end of these latter being then evacuated outside the lip as in the preceding embodiments.

The embodiments of FIGS. 7, 8 and 9 can be used by constructing, as in the device of FIG. 6a, the lip in two portions of which one contains the acoustic attenuation structure (11') and is connected to the other to define the complete lip.

It is finally to be noted that the strips such as 11a and the alignments such as 23, in FIG. 5b, can be provided with transverse grooves, passages or corridors so as further to improve heat exchange.

What is claimed is:

1. Process for de-icing an air intake cowling (5) of a reaction motor, comprising an air intake lip (6, 6', 6", 6'''), a system (10, 1) for de-icing the lip provided with warm fluid under pressure, and acoustic attenuation means (11, 11') forming an integral portion of a predetermined region of said lip, said acoustic attenuation means comprising separate islands (11a, 11'a, 11b, 11c, 23) each formed of a sandwich comprising an acoustically resistive porous layer forming a portion of the external envelope (6i) of the fan channel (3) delimited by said air intake lip, porous core, and a reflector (13, 13'), the process comprising the steps of:

sending into the lip the warm fluid under pressure of said de-icing system, and
   causing said fluid to escape outside said cowling, through one or several openings (20, 21) of suitable shape and size, provided in said cowling (5).

2. The process of claim 1, wherein the porous core is a single layer porous core.

3. The process of claim 1, wherein the porous core is a multi-layer porous core.

4. The process of claim 1, wherein in said step of sending the warm fluid into the lip, the warm fluid is sent in a direction of said acoustic attenuation islands.

5. De-icing device for an air intake cowling, said cowling (5) comprising:

an air intake lip (6, 6', 6", 6''');
   means (10, 1) for the injection into the lip of a warm de-icing fluid under pressure;
   acoustic attenuation means (11, 11') forming an integral portion of a predetermined region of said lip; and
   means (20 to 22) for evacuating outside the cowling the de-icing fluid, wherein said acoustic attenuation means comprise plural separate islands (11a, 23) each formed of a sandwich comprising an acoustically resistive porous layer (14) forming a portion of at least the internal wall (6i, 6'i, 6"i) of the lip, a central cellular core (12) and a reflector (13, 13', 23').

6. De-icing device according to claim 5, characterized in that the central core (12) of the islands is a honeycomb structure.

7. De-icing device according to claim 5, characterized in that the central core of the islands is formed of tubular lugs (23).

8. De-icing device according to claim 7, characterized in that the separate lugs are strips (11a, 11b, 11c) formed of at least one row of cells, disposed in parallel.

9. De-icing device according to claim 8, characterized in that said strips (11a) are positioned oblique relative to an axis of the fan channel (3).

10. De-icing device according to claim 9, characterized in that the de-icing fluid is distributed in the lip (6, 6', 6") by circular tubing (10) provided with ejection openings (19) suitably oriented.

11. De-icing device according to claim 8, characterized in that said strips (11'a) are orthogonal to an axis of the fan channel (3).

12. De-icing device according to claim 5, characterized in that the separate islands are alignments of juxtaposed tubular lugs (23) disposed in parallel.

13. De-icing device according to claim 5, wherein the islands share a common reflector (13'), the reflector being provided with scoops (32) communicating with spaces (31) between islands and being bordered by non-porous portions of the internal wall of the lip (6''').

14. De-icing device according to claim 5, characterized in that the assembly of the islands (11"a) is covered with a piece (40) channeling the de-icing fluid toward spaces (31) between islands.

15. De-icing device according to claim 5, characterized in that the de-icing fluid is distributed in the lip (6''') by at least one ejection device (1) creating a circular flow (A) of the fluid in the lip.

16. De-icing device according to claim 5, characterized in that the lip (6') is formed from two assembled portions of which one (6'a) integrates the acoustic attenuation structure (11a).

* * * * *